United States Patent [19]

Boscher et al.

[11] Patent Number: 4,730,887
[45] Date of Patent: Mar. 15, 1988

[54] FIBER OPTIC COUPLING DEVICE AND METHOD OF CONSTRUCTING SUCH A DEVICE

[75] Inventors: Daniel Boscher, Perros Guirec; Jean-Michel Landouar; Marie Morin, both of Lannion, all of France

[73] Assignee: Etat Francais represente par le Ministre des PTT (Centre National d'Etudes des Telecommunications), France

[21] Appl. No.: 820,616

[22] Filed: Jan. 21, 1986

[30] Foreign Application Priority Data

Jan. 22, 1985 [FR] France ................... 85 00855

[51] Int. Cl.$^4$ ............................................. G02B 6/28
[52] U.S. Cl. ......................... 350/96.16; 350/96.15; 350/96.20; 350/320
[58] Field of Search ............... 350/96.15, 96.16, 96.20, 350/320

[56] References Cited

U.S. PATENT DOCUMENTS 4,511,207  4/1985  Newton et al. ................. 350/96.15

FOREIGN PATENT DOCUMENTS 0148715  9/1982  Japan ................................. 350/96.2
0082209  5/1983  Japan ................................ 350/96.15

Primary Examiner—John Lee
Assistant Examiner—John Ngo
Attorney, Agent, or Firm—Larson and Taylor

[57] ABSTRACT

A fiber optic coupler for coupling $2^n$ inputs and one output, n being an integer, comprising: two halves of a solid part formed with $2^n-1$ identical convex grooves parallel to a midplane and to a fractioning plane along which the part was separated into two halves. A plurality of optical fiber lengths are located each in one of the grooves, the halves and fibers are cut along a plane transverse to the midplane and fractioning plane at a depth selected for eliminating half of the cross-section of the fibers in the midplane. An auxiliary part formed with $2^n-1$ grooves having the same distribution as the $2^n-1$ grooves in the halves is retained in abutment against the halves, end portions of the fiber lengths being located in the grooves for optical coupling each with the end surfaces of two lengths, whereby $2^n-1$ elementary 2-to-1 elementary couplings are achieved.

8 Claims, 10 Drawing Figures

FIBER OPTIC COUPLING DEVICE AND METHOD OF CONSTRUCTING SUCH A DEVICE

BACKGROUND OF THE INVENTION

The invention relates to fiber optic coupling devices suitable for use in fiber optic communication systems. It is of particular interest in optical fiber distribution networks, such as video communication networks.

Numerous methods are already known for coupling an output to a plurality of optical fiber inputs (the term "input" and "output" being used here solely for the sake of convenience and in no wise implying a particular direction of propagation of light). Coupling may be achieved by twisting fibers, then by drawing them so as to cause fusion thereof. Integrated optics have also been used, made from glass or from transparent plastic material, as well as coupling mixer "bars" and optical beams. Such approaches are difficult to carry out on an industrial scale or are unsatisfactory as regards the transmission characteristics the losses being excessive or distribution balance being difficult to obtain.

There is disclosed in U.S. Pat. No. 4,511,207 (Newton et al) a fiber optic data distributor having arrays of fiber lengths maintained in mutual alignment for light coupling by chips formed with V grooves. The lengths in one array may consist of successive loops of a same fiber. However, such a system as such does not constitute a m-to-1 coupler (m being greater than 1).

European specification No. 121 460 describes a blank suitable for making a "2-to-1" optical coupling device, comprising a convex fiber receiving groove formed in a first face of the piece. From such a blank, which has a single groove, a coupling device is formed by cutting it into two halves which are then placed opposite each other. The assembly of the two halves has a front face which may be joined to a centering unit receiving a connector end piece. Thus, a two branch coupler is formed which is of low cost and in which the two inputs may be balanced.

SUMMARY OF THE INVENTION

It is an object of the invention to provide a device for coupling up to $2^n$ inputs to one output (n being an integer) by using a blank similar to that of European EP 121 460, however with a plurality of parallel grooves, such coupling being simple, exhibiting acceptable coupling losses and satisfactory balancing light distribution between the inputs.

For that, there is provided a fiber optic coupler for coupling $2^n$ inputs and one output, n being an integer, comprising: two halves of a solid part formed with $2^n-1$ identical convex grooves parallel to a midplane of said part and to a fractioning plane along which said part was separated into said two halves: a plurality of optical fiber lengths each located in one of said grooves, said halves and fibers being cut along a plane transverse to said midplane and to said fractional plane at a depth selected for eliminating substantially half of the cross-section of said fibers in said midplane; and an auxiliary part formed with $2^n-1$ grooves having the same distribution as the $2^n-1$ grooves in said halves, retained in abutment against said halves, end portions of said fiber lengths being located in said grooves for optical coupling each with the end surfaces of two of said lengths, whereby $2^n-1$ elementary 2-to-1 elementary couplings are achieved.

The invention also provides a process for manufacturing a fiber optic coupler having at most $2^n$ inputs (n being an integer) and one output, comprising the steps of:

providing a solid part symmetric with respect to two orthogonal midplanes and formed with $2^n-1$ convex identical parallel grooves symmetrically distributed with respect to one of said midplanes;

securing a fiber length in each of said grooves;

cutting said part and the fiber length along a plane transverse to said midplanes at such a depth to remove half of the cross-section of the fiber length that of said midplanes which is orthogonal to the grooves for forming a flat abutment surface;

cutting said part into halves along the outer of said midplanes and locating said parts with two halves of said abutting surface in mutual contact;

providing an auxiliary part formed with $2^n-1$ grooves having the same distribution as the grooves in said solid part;

locating an output fiber within the central groove of said auxiliary part;

forming a loop with $2(2^n-1)-2^n$ end portions of said fiber lengths originating from the end portion of said halves opposed to the cut into the other grooves of said auxiliary part;

holding the auxiliary part and said two halves in contact with adjacent ends of said fiber lengths in alignment for constituting elementary 2-to-1 cascaded couplers.

The invention will be better understood from the following description of a particular embodiment, given by way of example, using a basic piece similar to that described in European 121 460. The description refers to the accompanying drawings.

SHORT DESCRIPTION OF THE DRAWINGS

DETAILED DESCRIPTION OF A PARTICULAR EMBODIMENT

Figure 1:
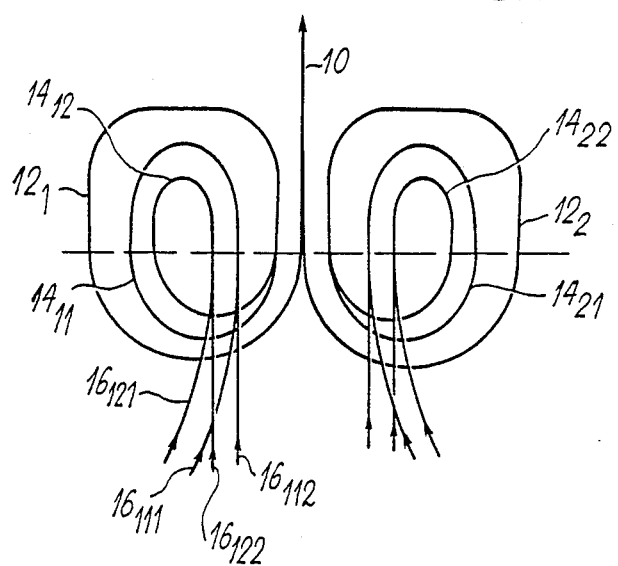
FIG. 1 is a diagram showing how a coupler having $2^n$ inputs and an output may be constructed by cascading $2^n-1$ elementary couplers.

Before describing the actual construction and the method of constructing a coupling device of the invention, it may be useful to describe how a plurality of 2-to-1 couplings may be cascaded. FIG. 1 shows such a cascaded arrangement in the case of a "8-to-1" coupler. i.e. a a $2^n$-to-1 coupler for n=3. The coupling device comprises a fiber section length 10 placed in its median plane and forming a single output of the device. This fiber length 10 is coupled to two sections $12_1$ and $12_2$ looped back to a front face where, in turn, they are coupled respectively to sections $14_{11}$ and $14_{12}$ on the one hand and to $14_{21}$ and $14_{22}$ on the other. Finally, each of the sections 14 is looped back and coupled to two sections which form two inputs $16_{121}$ and $16_{122}$ in the case of section $14_{12}$.

The coupling device whose diagram has been shown in FIG. 1 may be formed from a basic part 20 which may be similar to those descrited in European 121,460 or French 84 09085 but with $2^n - 1$ equidistant parallel grooves 21 (in being equal to 3 if it is desired to form a coupler of the kind shown schematically in FIG. 1).

Figure 2:
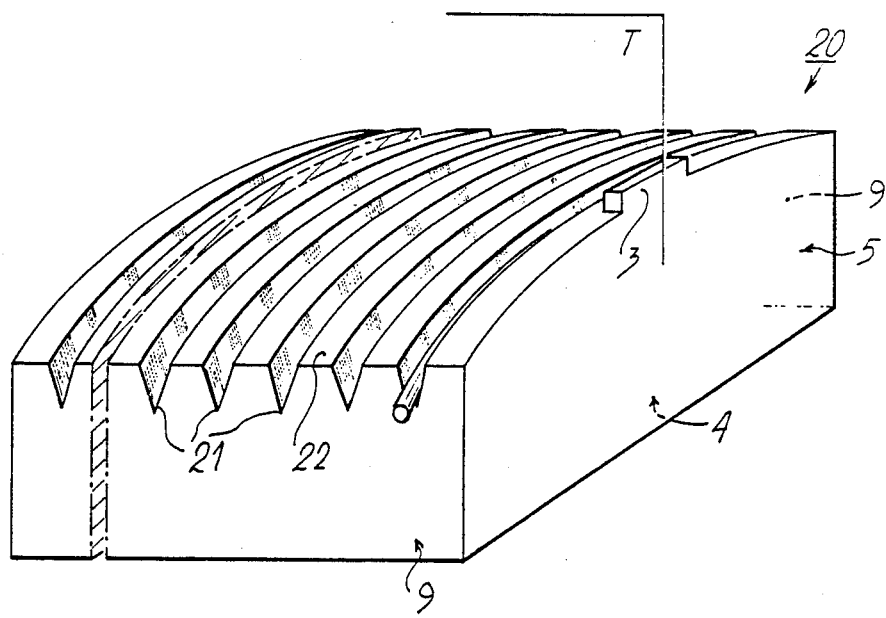
FIG. 2 is an isometric view of the basic part for forming the coupling device, the scale not being respected for the sake of clarity.

FIG. 2 shows a basic part 20 which has a longitudinal plane of symmetry (along the large dimension of the part) and a transverse plane of symmetry, orthogonal to the preceding one. A first face 22 of part 20, symmetrical with respect to the two planes, is of a convex shape. In this work face 22 are formed $2^n - 1$ V-shaped grooves 21. The median groove 21 is placed in the longitudinal plane of symmetry. The other grooves are placed symmetrically with respect to the median groove. All the grooves have the same curvature. In the zone close to the transverse plane of symmetry, the radius of curvature is chosen as a function of the characteristics of the fiber to be coupled and of the light injection conditions. The position of grooves 21 must be defined accurately with respect to several reference surfaces provided on the part.

A first reference surface 3, whose role is important, is perpendicular to the two planes of symmetry and it is situated in the vicinity of the central zone of the grooves. It is advantageously formed on a tenon integrally molded with the piece. A second flat reference surface 4, opposite the work surface 22, forms the bottom of the piece. A flat lateral surface 5 is parallel to the longitudinal plane of symmetry and is situated at a predetermined distance therefrom. Finally, the end surfaces 9 of the part defines the transverse plane of symmetry.

The sequence of operations to be carried out for forming a coupling device using a basic part of the kind shown in FIG. 2 is illustrated in the diagrams of FIGS. 3a to 3d.

The first operation to be carried out consists in glueing a fiber length in each groove. The fibers are advantageously glued using the same resin as that which was used for manufacturing the part 20.

Figure 3A:
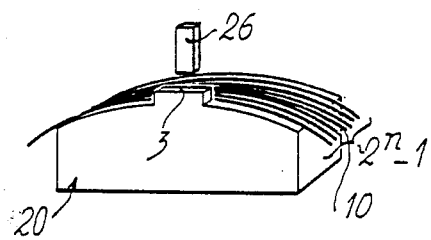
FIGS. 3a–3d are diagrams showing successive steps in constructing the coupling device.
Figure 3B:
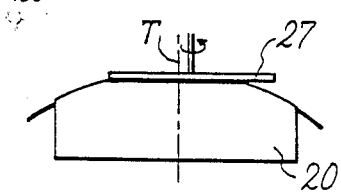

The part with its fibers (FIG. 3a) is then down in a longitudinal plane situated at a predetermined datum level with respect to the reference surface 3 (FIG. 3b). The depth of levelling down must be such that the cross-section of the fibers is reduced, in the transverse plane of symmetry T, to half its original value. The differences of depth between the grooves introduce a dispersion in the abrading depth of the fibers. Since such dispersion must not exceed a few microns, the mold for manufacturing part 20 has to be constructed so that the tolerance on the depth grooves does not exceed this value. In fact, dispersion in the abrading depth introduces a second order deviation in the optical characteristics of the coupling device.

Abrasion may be carried out without difficulty using a disk 27 rotating a high speed with a feeler 26 used as a depth probe in abutment on surface 3 for achieving the required accuracy.

Figure 4:
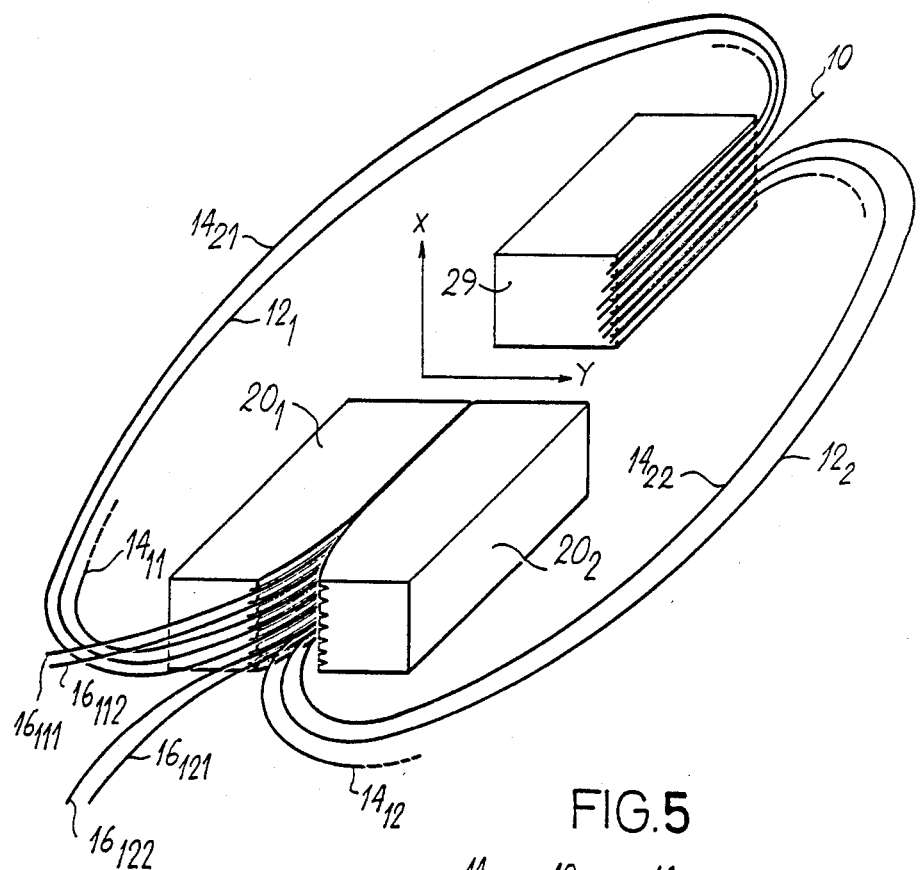
FIG. 4 is an isometric view showing how fiber lengths are positioned in the auxiliary part, some only of the fiber lengths being shown.
Figure 3C:
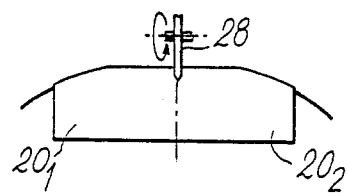
Figure 3D:
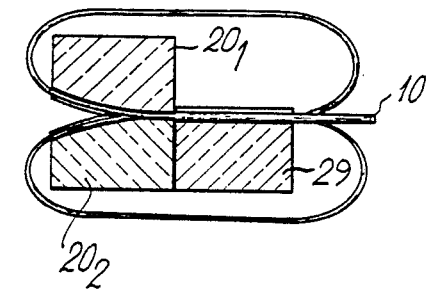

Part 20 is then sawn through its transverse plane of symmetry T so as to form two halves $20_1$ and $20_2$ (FIG. 3c). This operation may be carried out by cutting with a saw grinder 28. The levelled down surfaces of two halves $20_1$ and $20_2$ are placed in contact with respect to each other by abutting of the two cut faces against a same reference gauge. Looping will then be achieved by using an auxiliary part 29 also having $2^n - 1$ grooves, with the same spacing as the grooves in part 20, and also comprising two reference surfaces, one perpendicular to the plane of the grooves and the other parallel to the plane of the grooves. The grooves may be straight, as shown in FIGS. 3d and 4. However, in order to avoid having to provide two molds and/or in order to guarantee coincidence between the grooves of part 20 and of part 29, a part 29 may be used which, before cutting, is identical to part 20.

Figure 5:
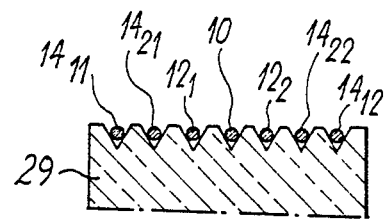
FIG. 5 is a cross-sectional view of the auxiliary part showing a possible arrangement of the fiber lengths in the grooves of that part.

A starter fiber 10 is then located in the central groove of part 29. Then part 29 is placed close to the joined halves $20_1$ and $20_2$ and the portion of the fiber lengths projecting out of the halves $20_1$ and $20_2$ are bent back towards part 29 (FIG. 4). Several arrangements are possible. As shown schematically in FIG. 5, the fiber lengths which are coupled to the starter fiber 10 are looped back to the grooves adjacent the starter fiber 10. These fiber lengths form the counterpart of those identified $12_1$ and $12_2$ in FIG. 1. Looping back may be continued as shown in FIG. 5 and then the inputs $16_{111}$, $16_{121}$, $16_{211}$ and $16_{221}$ will have the arrangement shown in FIG. 4.

Once the fiber lengths have been glued in position, the auxiliary part 29 and the fiber lengths are sawn perpendicularly to the grooves. Such sawing may be carried out in the same way as for part 20, using the reference faces for guaranteeing orthogonality of the sawing plane with respect to the grooves. Part 29 is applied against the assembly of parts $20_1$ and $20_2$. With halves $20_1$ and $20_2$ immobilized, a micromanipulator (not shown) for moving part 29 in directions X and Y is used for alignment. For that, using an optical apparatus, the position is sought which gives the maximum power at any one of the inputs 16 of the coupling device, when a constant light power is applied to the output 10.

Since the grooves have the same spacing on all the parts and since the reference surfaces are parallel, if one of the inputs 16 is in coincidence with any one of the lengths carried by part 29, it is not necessary to try to obtain coincidence on all the fibers successively.

Once coincidence has been obtained, the component is fixed using a bonding agent having an appropriate refraction index.

Figure 6:
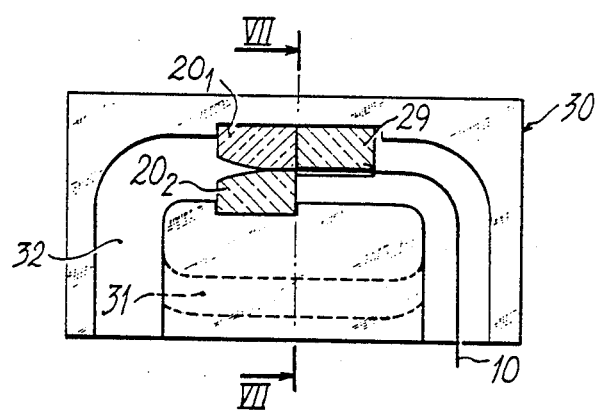
FIG. 6 is an elevational view showing the coupling device in a casing from which the lid has been removed.
Figure 7:
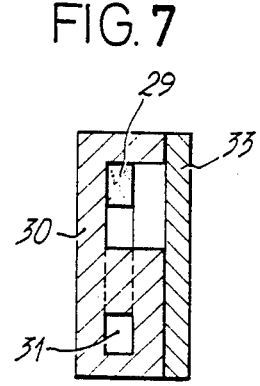
FIG. 7 is a sectional view through line VII—VII of FIG. 6.

The coupling device may then be encapsulated, typically in a casing of the kind shown in FIGS. 6 and 7. The casing comprises a body 30 which may be formed by assembling and bonding several parts and in which a passage 31 is provided for receiving fiber lengths serving for looping back the fiber lengths and a passage 32 for the inputs and the output. A lid 33 is provided for closing the passage after positioning.

By way of example, a "8-to-1" coupler for multimode optical fibers having a core diameter of 50 microns may be constructed using a base part 20 as described in European 121,460. The dimensions of the coupling device did not exceed $150 \times 100 \times 30$ mm. The casing was provided so that the minimuum radius of curvature imposed on the fibers was not less than 3 cm. Passage 32 comprised fiber receiving grooves and was adapted for filling with a filling material immobilizing the fibers after fitting.

The measurements carried out on such couplers showed that the insertion loss was less than 11 dB at all the inputs with a dispersion less than $\mp 1$ dB.

In practice, the invention has in general optimum interest when the number of inputs is eight. Below this number, other techniques may be used. Above, the difficulty of obtaining grooves with a substantially constant depth increases.

We claim:

1. A fiber optic coupler for coupling $2^n$ inputs and one output, n being an integer greater than zero, comprising:

two separate halves of a same solid part formed with $2^n - 1$ identical convex grooves parallel to a midplane of said part which is orthogonal to a fractioning plane along which said part was separated into said two halves;

a plurality of optical fiber lengths each located in one of said grooves, said halves and fiber lengths being cut along a plane transverse to said midplane and to said fractioning plane at a depth selected for eliminating substantially half of the cross-section of said fiber lengths in said midplane and for forming respective planar abutment surfaces on said halves; and an auxiliary part formed with $2^n - 1$ grooves having the same distribution as the $2^n - 1$ grooves in said halves.

said two halves being in mutual contact through their respective abutment surfaces and end portions of said fiber lengths being located in said grooves of said auxiliary part which is retained in abutment against said fractioning plane of said halves, at such a location that there is coupling between each of said end portions and the end surfaces of two respective ones of said fiber lengths, whereby $2^n - 1$ elementary 2-to-1 couplings are achieved.

2. A coupler according to claim 1, wherein said auxiliary part has the same shape as said solid part.

3. A fiber optic coupler according to claim 1, wherein said halves and auxiliary part each have seven grooves; an output fiber length is located in a central groove among said seven grooves in the auxiliary part; each of said halves receives three of said fiber lengths and the distal end portions of the three fiber lengths in a respective one of said grooves in the auxiliary part; and each of said halves receives four of said fiber lengths whose distal end portions are free and constitute input fibers.

4. A process for manufacturing a fiber optic coupler having a most $2^n$ inputs (n being an integer greater than zero) and one output, comprising the steps of:

providing a solid part symmetric with respect to two orthogonal midplanes and formed with $2^n - 1$ convex identical parallel grooves symmetrically distributed with respect to one of said midplanes;

securing a fiber length in each of said grooves;

cutting said part and the fiber length along a plane transverse to said midplanes at such a depth to remove half of the cross-section of the fiber length in the other of said midplanes, which is orthogonal to the grooves, for forming a flat abutment surface;

cutting said part into halves along said midplanes orthogonal to the grooves and locating said halves with two halves of said abutting surface in mutual contact;

providing an auxiliary part formed with $2^n - 1$ grooves having the same distribution as the grooves in said solid part;

locating an output fiber within the central groove of said auxiliary part;

forming a loop with $2(2^n - 1) - 2^n$ end portions of said fiber lengths originating from the end portion of said halves opposed to the cut into the other grooves of said auxiliary part;

holding the auxiliary part and said two halves in contact with adjacent ends of said fiber lengths in a symetrical end-to-end arrangement for constituting elementary 2-to-1 cascaded couplers.

5. A process according to claim 4, wherein said solid part and auxiliary part are manufactured by moulding in identical moulds.

6. A process according to claim 4, wherein said grooves in said auxiliary part are formed perpendicular to a reference surface.

7. A process according to claim 4, further comprising encapsulating the set consisting of said halves and auxiliary part in a housing having passages for said fiber lengths.

8. A fiber optic coupler for coupling $2_n$ inputs to one output, n being an integer greater than zero, comprising:

two solid part halves each formed with $2^n - 1$ identical convex grooves parallel to a common midplane of said part halves which is orthogonal to a front planar surface;

a plurality of optical fiber lengths each located in one of said grooves, said halves and fibers lengths being cut along a plane transverse to said midplane and to said front planar surface at a depth selected for eliminating substantially half of the cross-section of said fiber lengths in said midplane and for forming respective planar abutment surfaces on said halves; and an auxiliary part formed with $2^n - 1$ grooves having the same distribution as the $2^n - 1$ grooves in said halves, said two halves being in mutual contact through their respective abutment surfaces and symetrically located with respect to said abutment surfaces and said auxiliary part being retained in abutment against said front planar surface of said halves, and distal end portions of said fiber lengths being located in said grooves of said auxiliary part for coupling each of said distal end portions with the proximal end surfaces of two of said lengths, whereby $2^n - 1$ elementary 2-to-1 couplings are achieved.

* * * * *